United States Patent
Afsharian et al.

(10) Patent No.: US 9,929,638 B2
(45) Date of Patent: Mar. 27, 2018

(54) SOFT-START FOR RESONANT CONVERTERS

(71) Applicant: Murata Manufacturing Co., Ltd., Nagaokakyo-shi, Kyoto-fu (JP)

(72) Inventors: Jahangir Afsharian, Markham (CA); Takashi Hara, Markham (CA); Kamaljit Thandi, Markham (CA); Zhihua Yang, Markham (CA)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 14/433,703

(22) PCT Filed: Nov. 8, 2013

(86) PCT No.: PCT/US2013/069305
§ 371 (c)(1),
(2) Date: Apr. 6, 2015

(87) PCT Pub. No.: WO2014/074923
PCT Pub. Date: May 15, 2014

(65) Prior Publication Data
US 2015/0280545 A1    Oct. 1, 2015

Related U.S. Application Data

(60) Provisional application No. 61/724,464, filed on Nov. 9, 2012.

(51) Int. Cl.
*H02M 1/32* (2007.01)
*H02M 1/36* (2007.01)
(Continued)

(52) U.S. Cl.
CPC .............. *H02M 1/32* (2013.01); *H02M 1/08* (2013.01); *H02M 1/36* (2013.01);
(Continued)

(58) Field of Classification Search
CPC ............ H02M 1/08; H02M 1/12; H02M 1/14; H02M 1/32; H02M 1/36; H02M 3/335;
(Continued)

(56) References Cited

U.S. PATENT DOCUMENTS 5,359,281 A    10/1994   Barrow et al.
5,612,860 A *  3/1997    Meszlenyi ............ H02M 7/538
                                                        363/17

(Continued)

FOREIGN PATENT DOCUMENTS

JP    2001-190063 A    7/2001
JP    2010-220330 A    9/2010

OTHER PUBLICATIONS

Official Communication issued in International Patent Application No. PCT/US2013/069305, dated Feb. 18, 2014.
(Continued)

*Primary Examiner* — Yemane Mehari
(74) *Attorney, Agent, or Firm* — Keating & Bennett, LLP (57) ABSTRACT

A start-up circuit for a resonant converter is arranged such that, during start-up of the resonant converter, the start-up circuit provides a drive signal that is to be applied to a switching transistor of the resonant converter and that has a variable duty cycle and a variable frequency. A converter includes a voltage source, a capacitor connected to the voltage source, a first switching transistor connected to the voltage source, a transformer connected to the capacitor, and a start-up circuit arranged to drive the first switching transistor with the drive signal during start-up of the converter. A start-up method for a resonant converter including a first switching transistor includes driving the first switching transistor with a variable duty cycle and a variable frequency.

21 Claims, 12 Drawing Sheets

(51) Int. Cl.
*H02M 3/335* (2006.01)
*H02M 1/08* (2006.01)

(52) U.S. Cl.
CPC ... *H02M 3/33507* (2013.01); *H02M 3/33576* (2013.01); *Y02B 70/1433* (2013.01); *Y02P 80/112* (2015.11)

(58) Field of Classification Search
CPC ......... H02M 3/33507; H02M 3/33523; H02M 3/33569; H02M 3/3372; H02M 3/3376; H02M 3/3378; H02M 7/06; H02M 7/068; H02M 7/4815; H02M 7/517; H02M 7/537; H02M 7/5381; H02M 7/53806; Y02B 70/126; Y02B 70/1433; Y02B 70/1441
USPC ........... 323/21.02, 21.03, 16, 17, 26, 48, 49, 323/56.03, 126, 134
See application file for complete search history.

(56) References Cited

U.S. PATENT DOCUMENTS

| | | | |
|---|---|---|---|
| 8,018,740 B2* | 9/2011 | Sun | H02M 3/33569 363/131 |
| 8,786,269 B2* | 7/2014 | Menegoli | H02M 3/156 323/282 |
| 9,509,225 B2* | 11/2016 | Stephens | H02M 3/3376 |
| 2001/0017779 A1 | 8/2001 | Nagahara | |
| 2002/0163371 A1 | 11/2002 | Hall et al. | |
| 2010/0259951 A1* | 10/2010 | Adragna | H02M 3/337 363/17 |
| 2011/0164437 A1* | 7/2011 | Sun | H02M 3/33569 363/16 |
| 2012/0262954 A1* | 10/2012 | Duvnjak | H02M 1/4258 363/21.02 |

OTHER PUBLICATIONS

Choi, "Half-Bridge LLC Resonant Converter Design Using FSFR-Series Fairchild Power Switch," Fairchild Semiconductor Corporation, Rev. 1.0.1, May 15, 2012, pp. 1-17.

* cited by examiner

Fig. 11

SOFT-START FOR RESONANT CONVERTERS

BACKGROUND OF THE INVENTION

1. Field of the Invention

The present invention relates to DC-to-DC converters. More specifically, the present invention relates to resonant DC-to-DC converters.

2. Description of the Related Art

Sun et al. (U.S. Pat. No. 8,018,740) teaches operating an LLC resonant converter in a fixed-frequency and variable-duty-cycle operation mode during startup of the LLC resonant converter. The LLC resonant converter of Sun et al. switches to a variable-frequency and fixed-duty-cycle operation mode once startup is completed (e.g., when a predetermined voltage is reached at a load connected to an output of the LLC resonant converter). That is, during startup, the LLC resonant converter of Sun et al. operates in a pulse-width-modulated (PWM) mode, such that only the duty cycle is controlled and the frequency of the resonant converter remains fixed, and then switches to a pulse-frequency-modulation (PFM) mode after startup. Accordingly, precise control is needed in Sun et al. to determine a threshold for switching from the PWM mode to the PFM mode, which requires a complex control scheme provided by, for example, a digital controller. Further, conventional PFM controllers do not support controlling an LLC resonant converter as required by Sun et al.

The following problems can occur during startup of a resonant converter, for example, an LLC converter with PFM control.

The output voltage of the resonant converter can abruptly reach its maximum value within hundreds of micro-seconds of starting the resonant converter. Since a load of the resonant converter is typically capacitive, if the voltage of the resonant converter abruptly reaches its maximum value, a large inrush current can occur at the output of the resonant converter. Further, the voltage of the resonant converter abruptly reaching its maximum value can cause a voltage overshoot at the output of the resonant converter. The large inrush current and the voltage overshoot can damage both the resonant converter and the load.

Output voltage overshoot of the resonant converter can exceed a desired specification value.

A large inrush current in an output capacitor can decrease the life of components such as the output capacitor, switching elements of the resonant converter, a current transformer of the resonant converter, and a capacitor for detecting a resonant current. Further, a large inrush current can also damage the load connected to the output of the converter.

Over-current protection (OCP) can be activated by startup transients.

A large ripple voltage can appear at the output of the resonant converter due to a burst mode (i.e., the resonant converter quickly turning on and off for certain periods of time) at light load unless the switching frequency of the resonant converter can go very high. For example, if a normal operating frequency is about 200 kHz, at light load the operating frequency can reach about 800 kHz.

SUMMARY OF THE INVENTION

In view of the problems described above, preferred embodiments of the present invention provide a start-up circuit that provides a drive signal that is to be applied to a switching transistor of a resonant converter and that has a variable duty cycle and a variable frequency.

A start-up circuit for a resonant converter according to a preferred embodiment of the present invention is arranged such that, during start-up of the resonant converter, the start-up circuit provides a drive signal that is to be applied to a switching transistor of the resonant converter and that has a variable duty cycle and a variable frequency.

During start-up of the resonant converter, the duty cycle is preferably increased and the frequency is preferably decreased. Initially, the frequency is preferably set to the maximum frequency of the resonant converter, and the duty cycle is preferably set to the minimum duty cycle of the resonant converter. The frequency of the drive signal is preferably determined by a voltage-controlled oscillator that outputs a signal having a frequency dependent on an input voltage.

The duty cycle of the drive signal is preferably determined by comparing a feedback signal from the resonant converter and a sawtooth signal. The sawtooth signal preferably includes a linear or exponentially rising slope. The start-up circuit further preferably includes a current source, a capacitor, and a transistor arranged to provide the sawtooth signal. The comparison of the feedback signal and the sawtooth signal preferably includes hysteresis.

The duty cycle of the drive signal is preferably determined by comparing a ramp signal and a sawtooth signal. The ramp signal is preferably a down-slope signal or an up-slope signal.

A converter according to a preferred embodiment of the present invention includes a voltage source, a capacitor connected to the voltage source, a first switching transistor connected to the voltage source, a transformer connected to the capacitor, and a start-up circuit according to another preferred embodiment of the present invention arranged to drive the first switching transistor with the drive signal during start-up of the converter.

The converter further preferably includes a second switching transistor. The start-up circuit is also preferably arranged to drive the second switching transistor during start-up of the converter.

A start-up method according to a preferred embodiment of the present invention for a resonant converter including a first switching transistor includes driving the first switching transistor with a variable duty cycle and a variable frequency.

The method further preferably includes, initially, setting the duty cycle to a minimum duty cycle of the resonant converter and setting the frequency at maximum frequency of the resonant converter and, then, during start-up, increasing the duty cycle and decreasing the frequency. The method further preferably includes determining the frequency of the drive signal by changing a voltage input of a voltage-controlled oscillator. Preferably, the method further includes determining the duty cycle of the drive signal by comparing a feedback signal from the resonant converter and a sawtooth signal or by comparing a ramp signal and a sawtooth signal.

The resonant converter preferably further includes a second switching transistor. The method further preferably includes driving the second switching transistor with a variable duty cycle and a variable frequency.

The above and other features, elements, characteristics, steps, and advantages of the present invention will become more apparent from the following detailed description of preferred embodiments of the present invention with reference to the attached drawings.

DETAILED DESCRIPTION OF PREFERRED EMBODIMENTS

The preferred embodiments of the present invention are shown in FIGS. 1-11. The preferred embodiments of the present invention provide a soft-start control scheme for variable-frequency resonant converters for improving the above-described problems that occur during startup of conventional resonant converters. The soft-start control scheme according to the preferred embodiments of the present invention includes a variable duty cycle and a variable frequency during startup of the resonant converter.

In the soft-start control scheme according to the preferred embodiments of the present invention, the resonant converter operates at maximum switching frequency and minimum duty cycle at the beginning of startup of the resonant converter. After beginning startup of the resonant converter, the switching frequency gradually decreases to its minimum value and the duty cycle gradually increases to its maximum value. Since the output voltage of the resonant converter increases monotonically with a relatively longer time (as compared to a conventional resonant converter with a soft-start control scheme) during startup, the above-described problems that occur during startup of conventional resonant converters above will be mitigated. Minimum and maximum values for the duty cycle can be determined by a feedback signal from the secondary of the transformer of the resonant converter and by the particular circuit elements chosen for the resonant converter.

Figure 1:
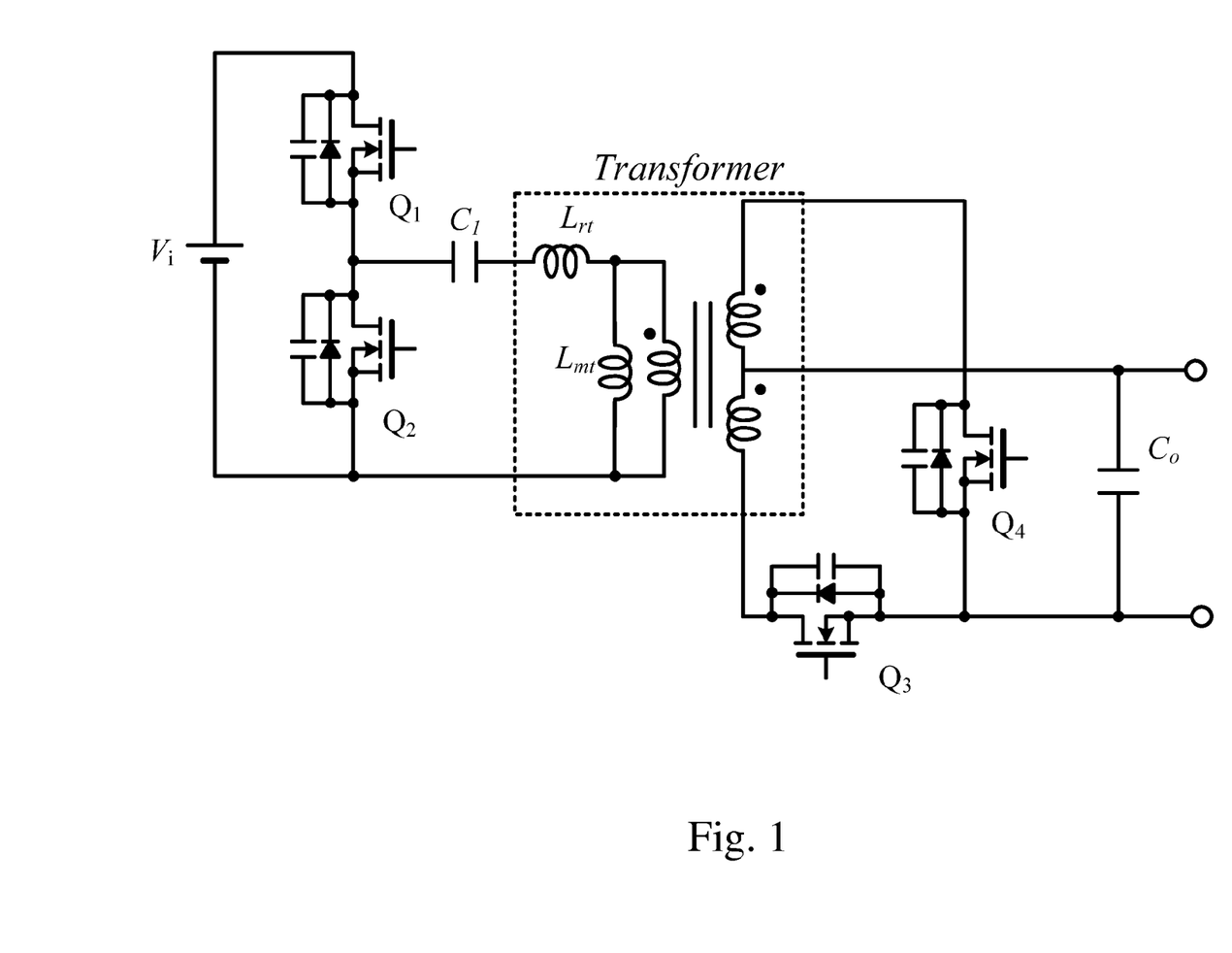
FIG. 1 is a circuit diagram of a half-bridge LLC resonant converter.

FIG. 1 shows a half-bridge LLC resonant converter having a startup performance that is improved by the preferred embodiments of the present invention. The half-bridge LLC resonant converter shown in FIG. 1 preferably includes at least one top-side switch Q1 and at least one bottom-side switch Q2 for switching an input voltage Vi. The variable-frequency and variable-duty-cycle control scheme is preferably implemented for the top-side switch Q1 and/or the bottom-side switch Q2. The half-bridge LLC resonant converter preferably additionally includes a resonant capacitor C1, an output capacitor Co, and synchronous rectifiers Q3 and Q4. Further, the transformer of the half-bridge LLC resonant converter includes a leakage inductor Lrt and a magnetizing inductor Lmt.

Figure 2A:
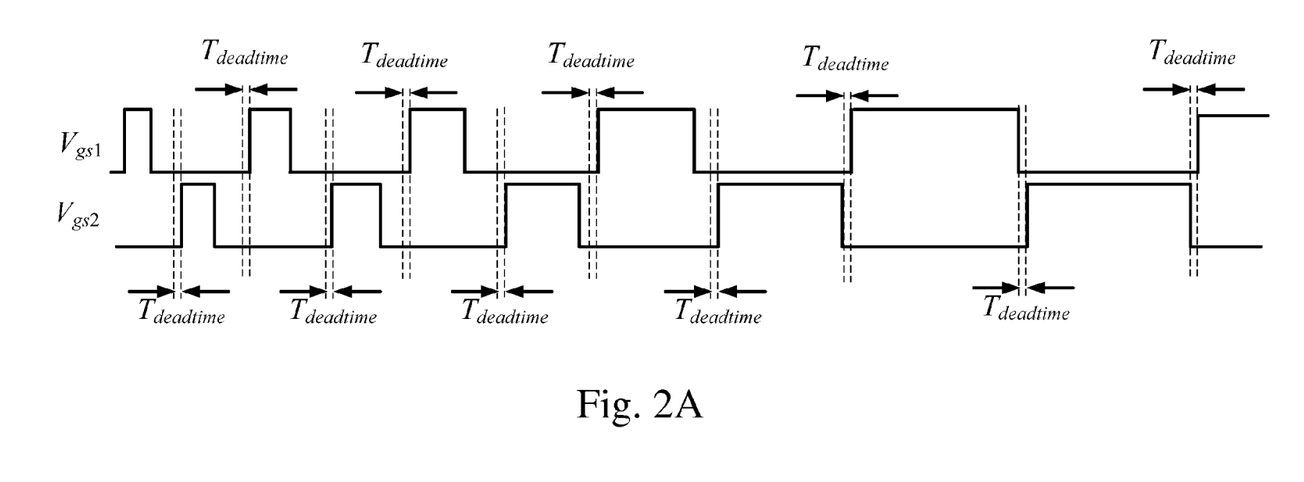
FIG. 2A shows variable-frequency, variable-duty-cycle drive signals for a top-side switch Q1 and for a bottom-side switch Q2.
Figure 2B:
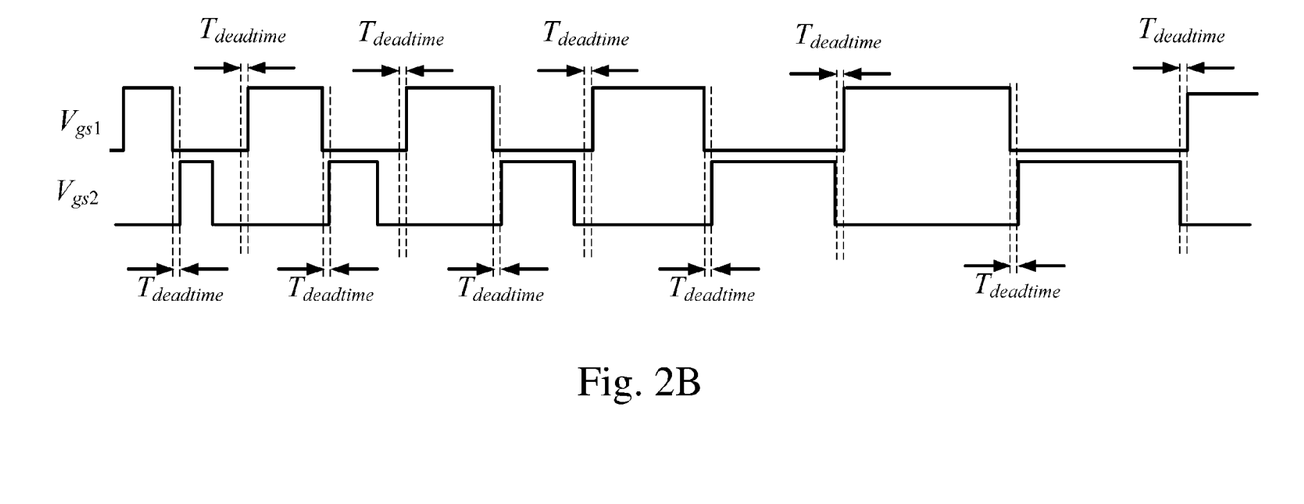
FIG. 2B shows variable-frequency, variable-duty-cycle drive signal for only the bottom-side switch Q2.
Figure 2C:
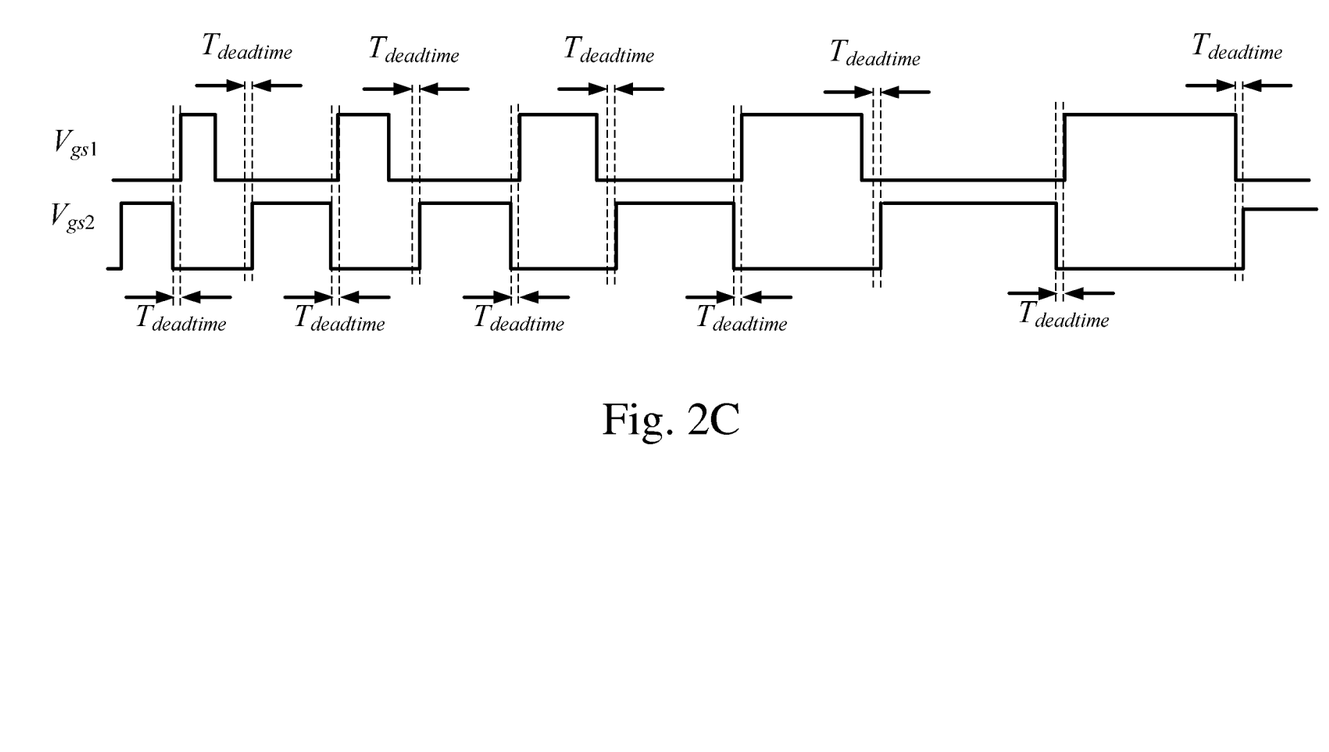
FIG. 2C shows variable-frequency, variable-duty-cycle drive signal for only the top-side switch Q1.

FIGS. 2A-2C show drive signals for a control scheme according to the preferred embodiments of the present invention. A gate-to-source drive signal Vgs1 applied to the top-side switch Q1 and a gate-to-source drive signal Vgs2 applied to the bottom-side switch Q2 have a deadtime $T_{deadtime}$ between a high side and a low side during a switching transition when both the top-side switch Q1 and the bottom-side switch Q2 are OFF. The deadtime $T_{deadtime}$ indicates a time period during which a controller that provides the gate-to-source drive signals Vgs1 and Vgs2 does not output any signal to prevent both the top-side switch Q1 and the bottom-side switch Q2 from being ON at the same time. The duty cycles of the drive signals shown in FIGS. 2A-2C start at the minimum and increase gradually while the frequencies of the drive signals start maximized and decrease gradually. FIG. 2A shows a variable frequency and a variable duty cycle for the top-side switch Q1 and the bottom-side switch Q2. FIG. 2B shows a variable frequency for both the top-side switch Q1 and the bottom-side switch Q2 and a variable duty cycle for only the bottom-side switch Q2. FIG. 2C shows a variable frequency for both the top-side switch Q1 and the bottom-side switch Q2 and a variable duty cycle for only the top-side switch Q1.

Figure 3:
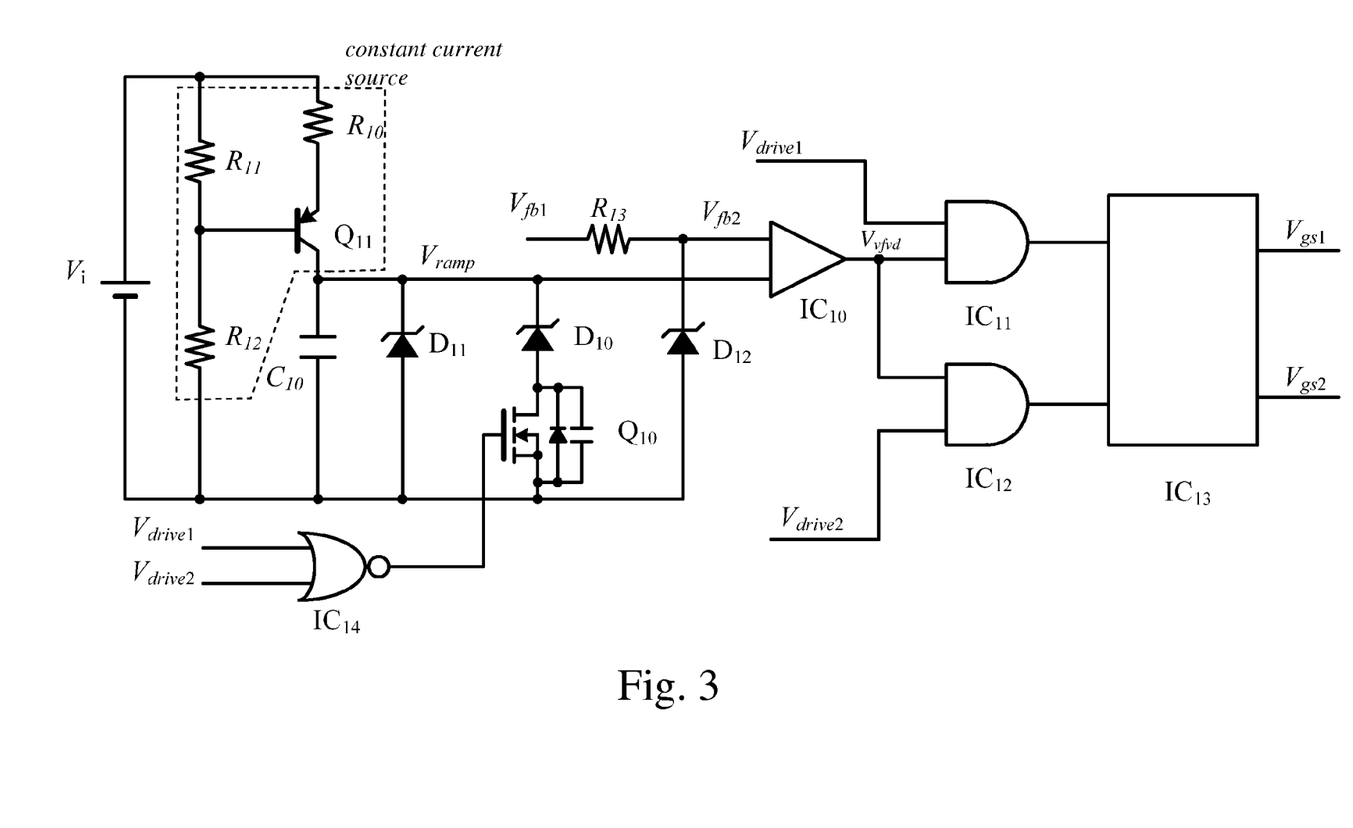
FIG. 3 is a circuit diagram of a variable-frequency and variable-duty-cycle control circuit for both the top- and bottom-side drive signals.

As shown in FIG. 3, a constant current source for charging a capacitor C10 is provided by switch Q11, resistor R10, resistor R11, and resistor R12. However, the preferred embodiments of the present invention are not limited to the constant current source as shown in FIG. 3, and any current source can be used in place of the constant current source shown in FIG. 3.

A controller for a resonant converter (not shown) according to preferred embodiments of the present invention can be an analog controller that can include two output channels. A top-side output channel of the controller provides a drive signal Vdrive1 that drives the top-side switch Q1 shown in FIG. 1, and a bottom-side output channel provides a drive signal Vdrive2 that drives the bottom-side switch Q2 shown in FIG. 1. The controller preferably includes a voltage-controlled oscillator that can output a signal having a frequency dependent on a voltage input to the controller. The voltage input to the controller to determine the frequency of the signal is preferably the feedback signal Vfb. That is, the controller provides drive signals Vdrive1 and Vdrive2 that have a variable frequency and a fixed duty cycle. The variable frequency of the drive signals Vgs1 and Vgs2 is determined by the variable frequency of the drive signals Vdrive1 and Vdrive2 provided by the controller.

Figure 10:
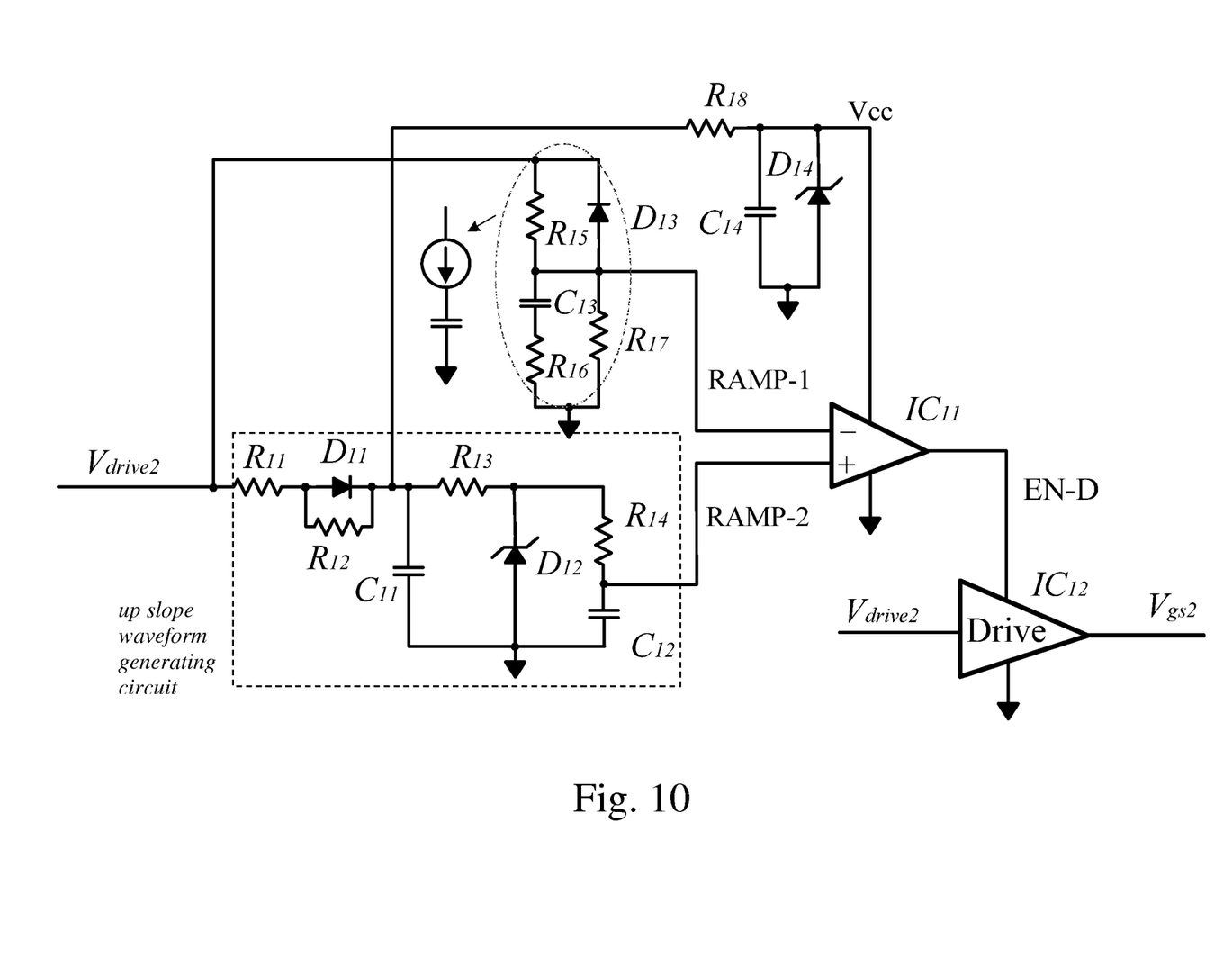
FIG. 10 is a circuit diagram of an example of a variable-frequency and variable-duty-cycle control circuit for only one side with a low-to-high ramp.

Methods for determining the variable duty cycle of the drive signals Vgs1 and Vgs2 are discussed below. The variable duty cycle of the drive signals Vgs1 and Vgs2 can be determined using a feedback signal Vfb as shown in FIGS. 3 and 5-7 or can be determined without using a feedback signal Vfb as shown in FIGS. 8 and 10.

In FIG. 3, the variable duty cycle is determined by comparing the feedback signal Vfb with a sawtooth signal Vramp. The sawtooth signal Vramp is generated using a current source, a capacitor V10, and a driving switch Q10. Because the driving switching Q10 is switched using the drive signals Vdrive1 or Vdrive2, the sawtooth signal has the same frequency and phase as the drive signals Vdrive1 and Vdrive2. A signal for driving switch Q10 can be generated by a NOR gate IC14 as shown in FIG. 3 that uses the drive signals Vdrive1 and Vdrive2 output from the controller of the resonant converter. Instead of using the NOR gate IC14, either output channel of the controller can be used to drive switch Q10. As an example, the controller is preferably implemented as an integrated circuit (e.g., a control IC).

Figure 4:
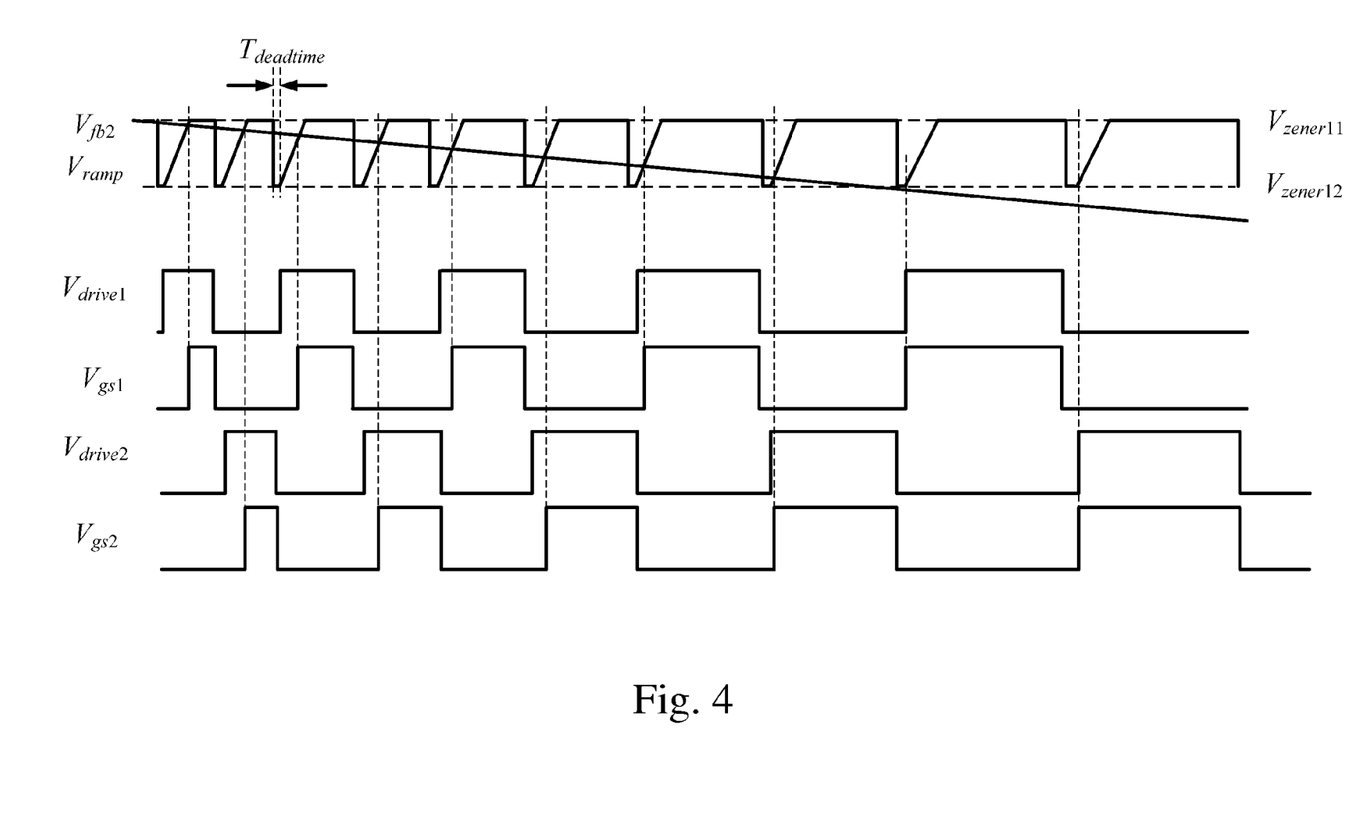
FIG. 4 shows the sawtooth signal, feedback signal, and the drive signals of FIG. 3.

According to the preferred embodiments of the present invention, a sawtooth signal Vramp is preferably generated as described below. The sawtooth signal Vramp has the same or substantially the same frequency and phase as the signal used for driving switch Q10. The rising slope of the sawtooth signal Vramp is linear or substantially linear if a constant current source is used. However, the rising slope of the sawtooth signal Vramp is exponential if a non-constant current source is used. A zener diode D10 sets a minimum voltage of the sawtooth signal Vramp, which sets the minimum variable frequency; a zener diode D11 sets a maximum voltage of the sawtooth signal Vramp, which sets the maximum variable frequency; and a zener diode D12 sets a minimum variable frequency and variable-duty-cycle control frequency as shown in FIG. 4.

For any resonant converter with PFM and a closed feedback loop, including the resonant converters according to the preferred embodiments of the present invention, a feedback signal Vfb corresponding to the output voltage of the resonant converter (including feedback signals Vfb1 and Vfb2) is supplied to the controller from the secondary of the transformer to generate variable-frequency signals Vgs1 and Vgs2. The feedback signal Vfb is usually the difference between the output voltage and a reference voltage so that the feedback signal Vfb decreases as the output voltage approaches the reference voltage. As the feedback signal Vfb decreases, the output voltage increases because the switching frequency decreases. The resistor R13 in FIG. 3 acts to clamp feedback signal Vfb2. In particular, an optical coupler (not shown) can be used to connect the secondary of the transformer to the controller. The feedback signal Vfb2 can be compared, by a comparator IC10, with the sawtooth signal Vramp described above for generating a variable-frequency, variable-duty-cycle signal Vvfvd. This signal Vvfvd generated by comparator IC10 can be used to drive either the top-side switch Q1 or the bottom-side switch Q2 as shown in FIG. 1.

The results of an AND operation of this signal Vvfvd with the drive signals Vdrive1 and Vdrive2 to drive the top-side switch Q1 and the bottom-side switch Q2 shown in FIG. 1 can also be used to drive the top switch Q1 and the bottom-side switch Q2 as shown in FIG. 3. Logical circuit IC11 is an AND gate with inputs provided by the signal Vvfvd output by the comparator IC10 and the variable-frequency, fixed-duty-cycle drive signal Vdrive1 output by the controller for the high side. Logical circuit IC12 is an AND gate with inputs provided by the signal Vvfvd output by the comparator IC10 and the variable-frequency, fixed-duty-cycle drive signal Vdrive2 output by the controller for the bottom side. The AND operation determines the variable duty cycle of the drive signals Vgs1 and Vgs2.

The outputs of logical circuits IC11 and IC12 are input to a MOSFET driver IC13, which outputs the gate-to-source drive signal Vgs1 applied to the top-side switch Q1 and the gate-to-source drive signal Vgs2 applied to the bottom-side switch Q2. In addition to driving the top-side switch Q1 and bottom-side switch Q2 based on the outputs of logical circuits IC11 and IC12, the MOSFET driver IC13 can provide a bootstrapping function. Further, the variable-frequency, fixed-duty-cycle drive signal Vdrive1 and the variable-frequency, fixed-duty-cycle drive signal Vdrive2 are input to an NOR logical circuit IC14, which outputs the signal used for driving switch Q10.

FIG. 4 shows a sawtooth signal Vramp and the drive signals shown in FIG. 3. The variable-frequency, variable-duty-cycle drive signals Vgs1 and Vgs2 for driving top-side switch Q1 and/or bottom-side switch Q2 can be generated by the above circuitry. The feedback signal Vfb2 drops gradually, and once it becomes lower than the minimum value of the sawtooth signal Vramp, the duty cycle reaches its maximum value (typically about 50%) and the duty cycle becomes constant. Once the duty cycle becomes constant, the soft-start of the resonant converter is completed, and the resonant converter enters into a normal operation mode with only PFM.

Figure 5:
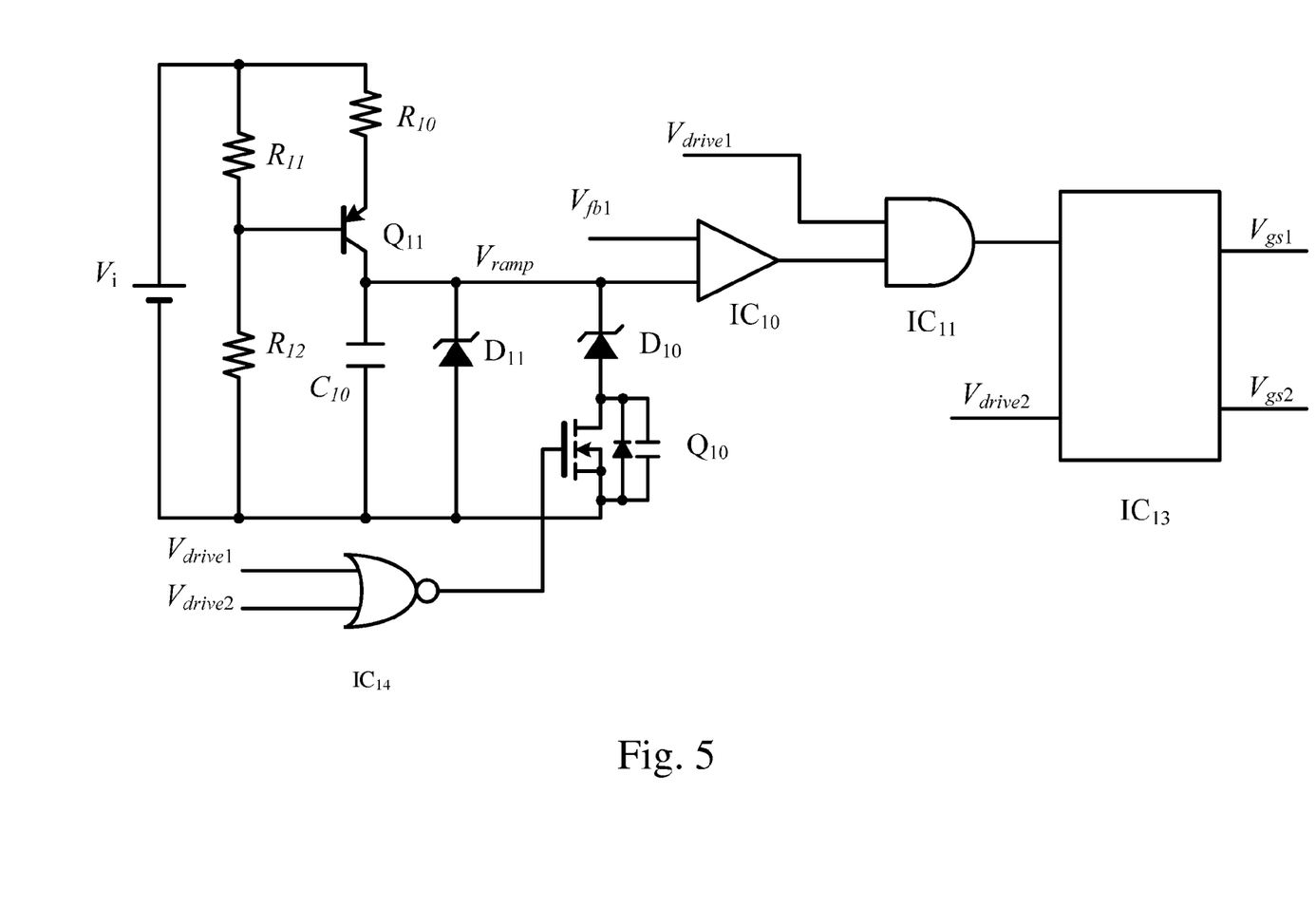
FIG. 5 is a circuit diagram of a variable-frequency and variable-duty-cycle control circuit for the top-side drive signal.
Figure 6:
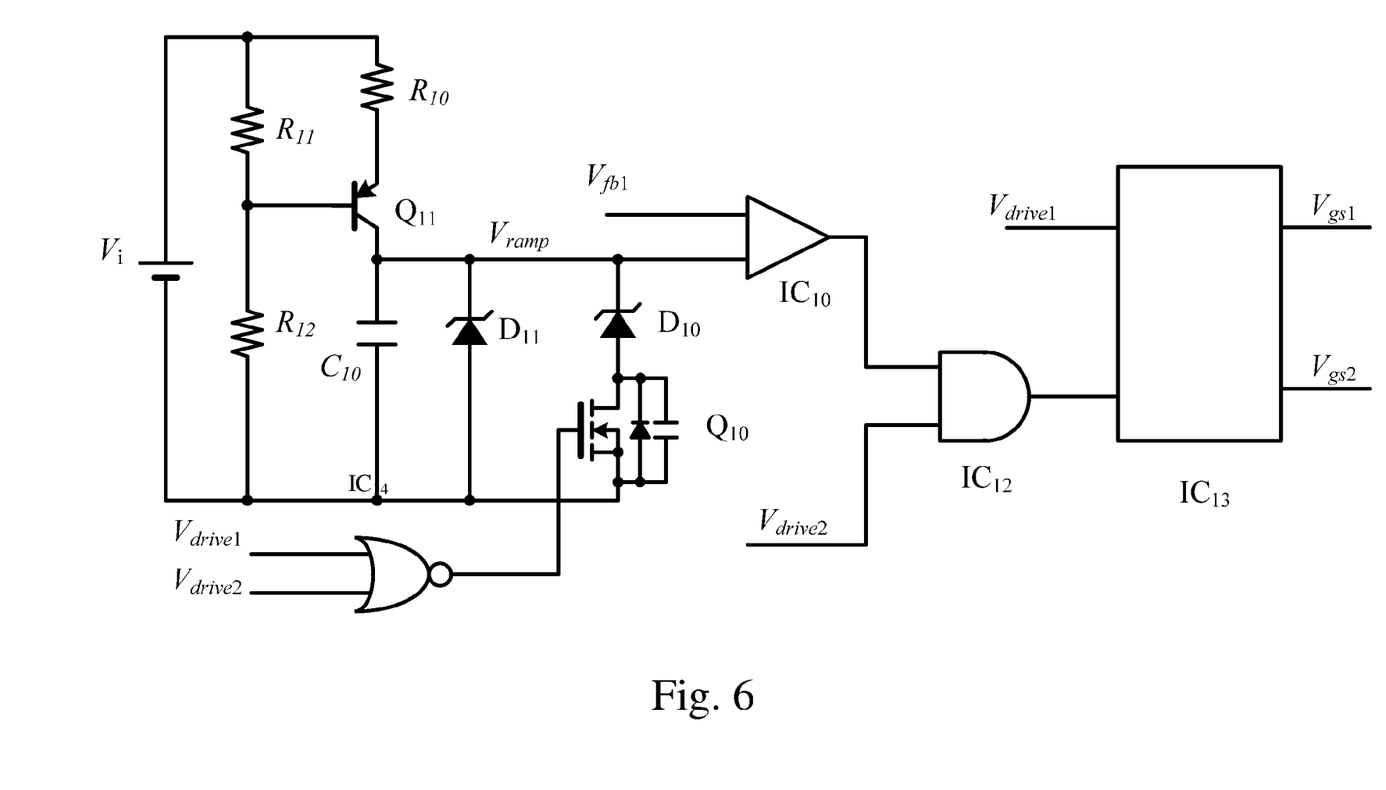
FIG. 6 is a circuit diagram of a variable-frequency and variable-duty-cycle control circuit for the bottom-side drive signal.

FIG. 5 shows a circuit that generates a variable-frequency, variable-duty-cycle drive signal for only the top-side switch Q1 as shown in FIG. 2C. FIG. 6 shows a circuit for generating a variable-frequency, variable-duty-cycle drive signal for only the bottom-side switch Q2 as shown in FIG. 2B. One of the benefits of providing a variable-frequency, variable-duty-cycle drive signal for only either the top-side switch Q1 or the bottom-side switch Q2 is less configuration is required.

Figure 7:
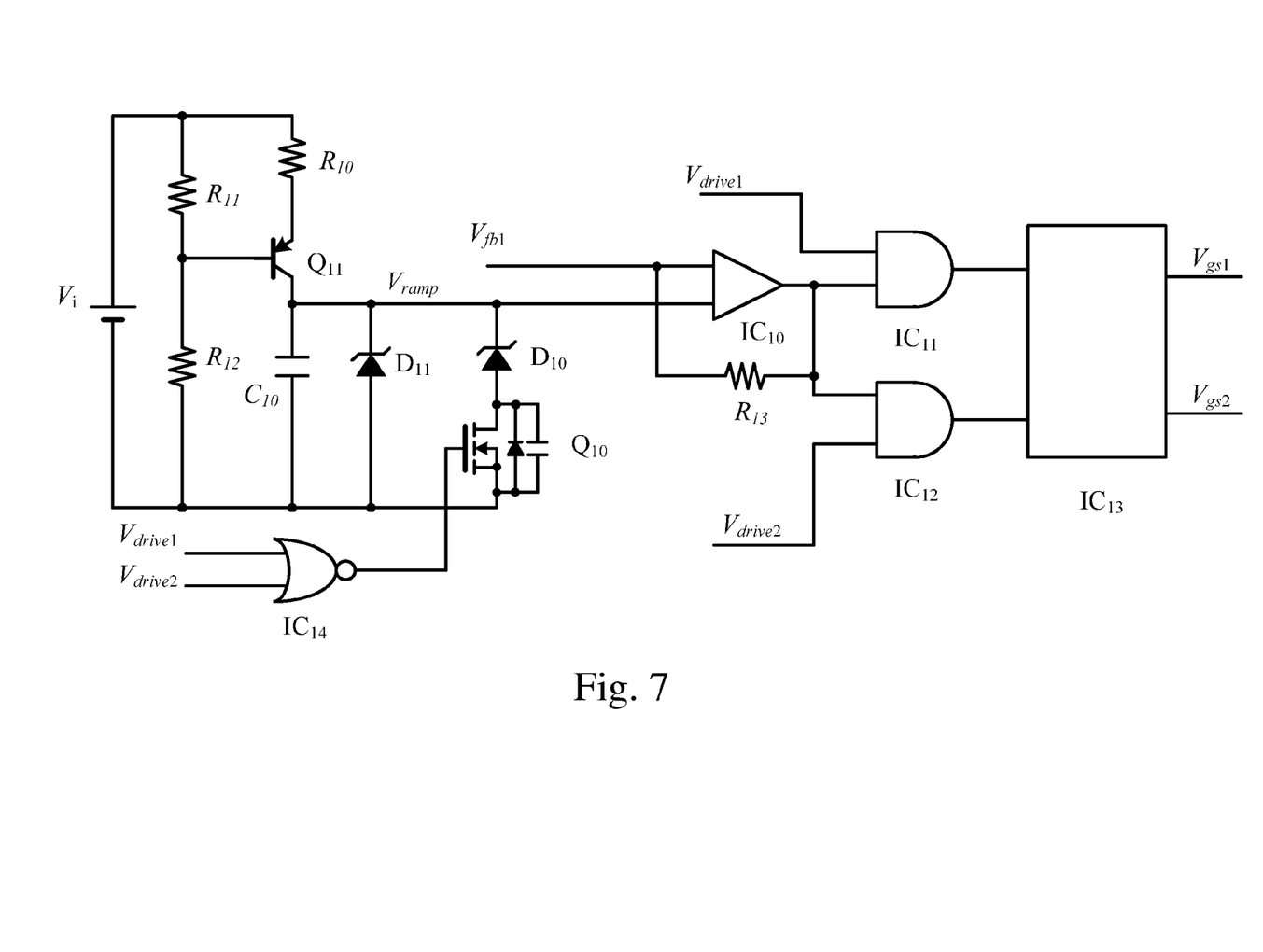
FIG. 7 is a circuit diagram of a variable-frequency and variable-duty-cycle control circuit with hysteresis for both the top- and bottom-side drive signals.
Figure 8:
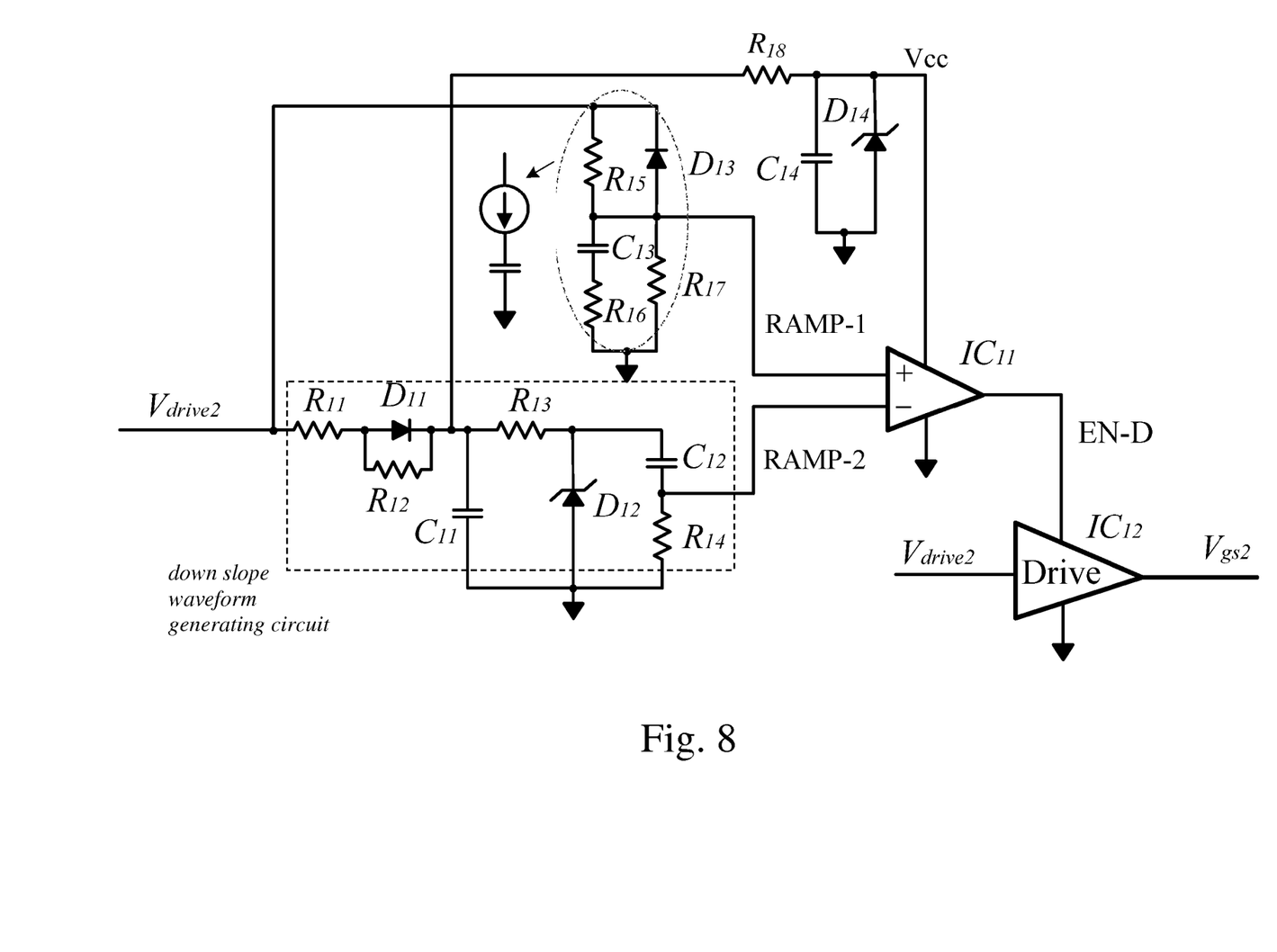
FIG. 8 is a circuit diagram of an example of a variable-frequency and variable-duty-cycle control circuit for only one side with a high-to-low ramp signal.

FIG. 7 shows a circuit with a hysteresis comparator with an additional resistor R13 that generates hysteresis, thereby providing the resonant converter with better noise immunity from noise that can occur in the feedback signal Vfb or the sawtooth signal Vramp.

As described above, the feedback signal Vfb1 can be compared with the sawtooth signal Vramp that generates the variable-frequency, variable-duty-cycle signal Vvfvd. However, the preferred embodiments of the present invention are not limited to using the feedback signal Vfb. In particular, any signal with linear or exponential slope can be used to generate the variable-frequency, variable-duty-cycle signal Vvfvd. As described above, the sawtooth signal Vramp having the same frequency and phase as the drive signal generated by the controller can be generated by using a non-constant current source. For example, a simple RC circuit can be used for generating the sawtooth signal Vramp.

FIGS. 8 and 10 show circuits in which the variable duty cycles of the drive signals Vgs1 and Vgs2 are determined without the feedback signal Vfb.

Figure 9:
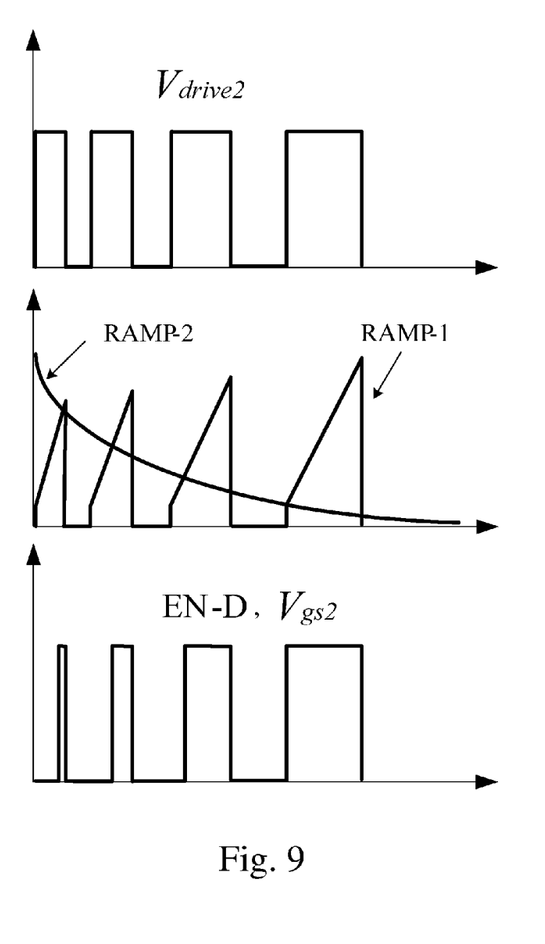
FIG. 9 shows the sawtooth signal, the high-to-low ramp signal, and the drive signals of FIG. 8.

FIG. 8 shows a preferred embodiment of the present invention that generates the variable-frequency, variable-duty-cycle signal EN-D, which corresponds to the variable-frequency, variable-duty-cycle signal Vvfvd discussed above. FIG. 9 shows the voltage signals generated by the circuit shown in FIG. 8.

As shown in FIG. 8, resistors R15, R16, and R17, capacitor C13, and diode D13 provide a circuit that generates the sawtooth signal RAMP-1. Resistors R11, R12, R13, and R14, capacitors C11 and C12, diode D11, and zener diode D12 provide a circuit that generates a down-slope signal RAMP-2 as shown in FIG. 9. Signals RAMP-1 and RAMP-2 are input to the comparator IC11. Resistor R18, capacitor C14, and diode D14 clamp the Vcc input voltage of comparator IC11 to limit the current and regulate the voltage. A signal EN-D output from comparator IC11 is connected to a Vcc input of drive IC IC12 that turns on and off the drive IC IC12 and controlling the gate-to-source drive signal Vgs2. Turning on and off the drive IC IC12 determines the variable duty cycle of the drive signal Vgs2.

Figure 11:
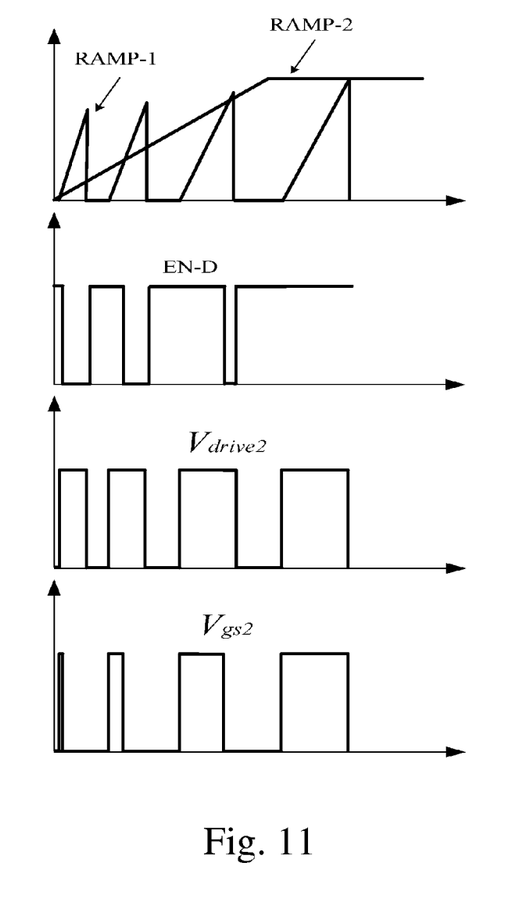
FIG. 11 shows the sawtooth signal, the low-to-high ramp signal, and the drive signals of FIG. 10.

FIG. 10 shows another a preferred embodiment of the present invention that generates the variable-frequency, variable-duty-cycle signal EN-D, which corresponds to the variable-frequency, variable-duty-cycle signal Vvfvd discussed above. FIG. 11 shows voltage signals generated by the circuit shown in FIG. 10. One of the benefits of using the circuits shown in FIGS. 8 and 10 is that a less expensive IC can be used.

As shown in FIG. 10, resistors R15, R16, and R17, capacitor C13, and diode D13 provide a circuit that generates the sawtooth signal RAMP-1. Resistors R11, R12, R13, and R14, capacitors C11 and C12, diode D11, and zener diode D12 provide a circuit that generates an up-slope signal RAMP-2 as shown in FIG. 11. Signals RAMP-1 and RAMP- are input to the comparator IC11. Resistor R18, capacitor C14, and diode D14 clamp the Vcc input voltage of comparator IC11 to limit the current and regulate the voltage. A signal EN-D output from comparator IC11 is connected to a Vcc input of drive IC IC12, to turn on and off the drive IC IC12 and controlling the gate-to-source drive signal Vgs2. Turning on and off the drive IC IC12 determines the variable duty cycle of the drive signal Vgs2.

The preferred embodiments of the present invention are described above with respect to analog circuitry. However, the preferred embodiments of the present invention can also be implemented with digital circuitry. In particular, the variable-frequency, variable-duty-cycle drive signal used during startup of a resonant converter can be generated by a microprocessor, a digital signal processor (DSP), or any other digital device.

Although not shown in the figures, the startup performance of resonant converters, including a full-bridge LLC resonant converter, can be improved by preferred embodiments of the present invention. Instead of a resonant converter with two switches, it is also possible to use a converter with a single switch or more than two switches, including four switches in a full-bridge topology. In a converter with more than one switch, it is possible to provide any one of the switches with a variable-frequency, variable-duty driving signal.

Although FIG. 1 shows the use of synchronous rectifiers Q3 and Q4, it is possible to use any suitable rectification circuit including diode rectifiers. Instead of relying solely on the parasitic leakage inductor Lrt, it is possible to use an additional inductor.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A start-up circuit for an LLC resonant converter arranged such that, during start-up of the LLC resonant converter, the start-up circuit operates the LLC resonant converter by providing a drive signal that is to be applied to a switching transistor of the LLC resonant converter and that has a variable pulse width and a variable frequency.

2. A start-up circuit of claim 1, wherein, during start-up of the LLC resonant converter, the pulse width is increased and the frequency is decreased.

3. A start-up circuit of claim 1, wherein, initially, the frequency is set to a maximum frequency of the LLC resonant converter and the pulse width is set to a minimum pulse width of the LLC resonant converter.

4. A start-up circuit of claim 1, wherein the frequency of the drive signal is determined by a voltage-controlled oscillator that outputs a signal having a frequency dependent on an input voltage.

5. A start-up circuit of claim 1, wherein the pulse width of the drive signal is determined by comparing a ramp signal and a sawtooth signal.

6. A start-up circuit of claim 5, wherein the ramp signal is a down-slope signal.

7. A start-up circuit of claim 5, wherein the ramp signal is an up-slope signal.

8. An LLC resonant converter comprising:
a voltage source;
a capacitor connected to the voltage source;
a first switching transistor connected to the voltage source;
a transformer connected to the capacitor; and
a start-up circuit according to claim 1 arranged to drive the first switching transistor with the drive signal during start-up of the LLC resonant converter.

9. An LLC resonant converter of claim 8, further comprising a second switching transistor.

10. An LLC resonant converter of claim 9, wherein the start-up circuit is also arranged to drive the second switching transistor during start-up of the LLC resonant converter.

11. A start-up circuit for an LLC resonant converter arranged such that, during start-up of the LLC resonant converter, the start-up circuit operates the LLC resonant converter by providing a drive signal that is to be applied to a switching transistor of the LLC resonant converter and that has a variable pulse width and a variable frequency; wherein
the pulse width of the drive signal is determined by comparing a feedback signal from the LLC resonant converter and a sawtooth signal.

12. A start-up circuit of claim 11, wherein the sawtooth signal includes a linear or exponentially rising slope.

13. A start-up circuit of claim 11, further comprising a current source, a capacitor, and a transistor arranged to provide the sawtooth signal.

14. A start-up circuit of claim 11, wherein comparison of the feedback signal and the sawtooth signal includes hysteresis.

15. A start-up method for an LLC resonant converter including a first switching transistor, the start-up method comprising operating the LLC resonant converter by driving the first switching transistor with a variable pulse width and a variable frequency.

16. A method of claim 15, further comprising:
initially, setting the pulse width to a minimum pulse width of the LLC resonant converter and setting the frequency at maximum frequency of the LLC resonant converter; and
then during start-up, increasing the pulse width and decreasing the frequency.

17. A method of claim 15, further comprising determining the frequency of the drive signal by changing a voltage input of a voltage-controlled oscillator.

18. A method of claim 15, further comprising determining the pulse width of the drive signal by comparing a ramp signal and a sawtooth signal.

19. A method of claim 15, wherein the LLC resonant converter includes a second switching transistor.

20. A method of claim 19, further comprising driving the second switching transistor with a variable pulse width and a variable frequency.

21. A start-up method for an LLC resonant converter including a first switching transistor, the start-up method comprising:
- operating the LLC resonant converter by driving the first switching transistor with a variable pulse width and a variable frequency; and
- determining the pulse width of the drive signal by comparing a feedback signal from the LLC resonant converter and a sawtooth signal.

* * * * *